US012011624B1

(12) United States Patent
Nance

(10) Patent No.: US 12,011,624 B1
(45) Date of Patent: Jun. 18, 2024

(54) PERSONNEL SAFETY CABLE MOUNT ASSEMBLY

(71) Applicant: Nance Solutions, Inc., Yukon, OK (US)

(72) Inventor: Jared Nance, Yukon, OK (US)

(73) Assignee: Nance Solutions, Inc., Yukon, OK (US)

(*) Notice: Subject to any disclaimer, the term of this patent is extended or adjusted under 35 U.S.C. 154(b) by 698 days.

(21) Appl. No.: 16/926,949

(22) Filed: Jul. 13, 2020

Related U.S. Application Data

(60) Provisional application No. 62/873,376, filed on Jul. 12, 2019.

(51) Int. Cl.
*A62B 35/00* (2006.01)
*E21B 41/00* (2006.01)

(52) U.S. Cl.
CPC ...... *A62B 35/0068* (2013.01); *A62B 35/0075* (2013.01); *A62B 35/0093* (2013.01); *E21B 41/0021* (2013.01)

(58) Field of Classification Search
CPC ............ A62B 35/0068; A62B 35/0075; A62B 35/0093; A62B 35/0037; A62B 35/005; A62B 35/0025; A62B 35/0062; A62B 1/04; A62B 1/20; A62B 99/00; A62B 9/04; E21B 41/0021; E21B 44/00; E21B 47/024; E21B 4/18; E21B 19/004; E21B 40/001; G08B 3/10; G08B 5/22; A01M 31/02; A01M 31/006; A01M 31/00; E04G 21/3223; E06C 7/186; E06C 7/187; E06C 7/18; E06C 7/006; E04H 12/22; E04H 12/2269; E04H 12/2253
See application file for complete search history.

(56) References Cited

U.S. PATENT DOCUMENTS

| | | | | | |
|---|---|---|---|---|---|
| 3,709,261 | A * | 1/1973 | Jones | B65D 59/06 | 138/89.4 |
| 4,011,617 | A * | 3/1977 | Toelke | E21B 17/006 | 15/104.04 |
| 4,458,934 | A * | 7/1984 | Janzen | E21B 19/10 | 294/102.2 |
| 4,502,534 | A * | 3/1985 | Roche | E21B 21/08 | 251/1.2 |
| 4,690,213 | A * | 9/1987 | Stannard | E21B 33/062 | 166/82.1 |
| 4,942,943 | A * | 7/1990 | Flaherty | A62B 35/04 | 248/539 |
| 5,011,106 | A * | 4/1991 | Cody | E04G 21/3276 | 248/237 |
| 5,351,767 | A * | 10/1994 | Stogner | E21B 19/16 | 175/203 |

(Continued)

*Primary Examiner* — Jessica L Laux
*Assistant Examiner* — Kathleen M. McFarland
(74) *Attorney, Agent, or Firm* — Head, Johnson, Kachigian & Wilkinson, PC

(57) ABSTRACT

A personnel safety cable mount assembly for a floor having a frustoconical recess in the floor. In one preferred embodiment, the assembly includes a base receivable in and through an opening or recess of the floor. A pole extends vertically from the base. A connector bracket is located at a top of the pole. At least one lanyard is connected to the connector bracket with the lanyard having an extending cable adapted to attach to personnel.

11 Claims, 4 Drawing Sheets

(56) References Cited

U.S. PATENT DOCUMENTS 5,454,197 A * 10/1995 Horrigan ............. E04G 21/3276
248/237
6,016,890 A * 1/2000 Whitmer ............ A62B 35/0068
182/36
6,834,745 B2 * 12/2004 Vandelinde ........ A62B 35/0068
182/3
7,494,300 B2 * 2/2009 Blank ....................... E02D 5/80
405/259.1
7,537,085 B2 * 5/2009 Vetesnik ............. E04G 21/3276
182/45
8,297,873 B1 * 10/2012 Schram ................... E01F 9/685
40/607.04
8,684,136 B2 * 4/2014 Chilton ................... B66C 23/26
212/175
9,010,487 B2 * 4/2015 Cruz ................... E04G 21/3276
182/3
9,616,255 B1 * 4/2017 Liddle ................ A62B 35/0068
9,649,516 B2 * 5/2017 Meyer .................... A62B 35/04
9,915,110 B2 * 3/2018 Berrier .................. E21B 19/164
10,022,610 B2 * 7/2018 Brodie ............... A62B 35/0056
10,347,109 B2 * 7/2019 Troy .................. G08B 21/0446
10,512,800 B2 * 12/2019 Carillo ............... A62B 35/0068
10,549,134 B1 * 2/2020 Stawychny ......... E04G 21/3276
11,083,917 B2 * 8/2021 Saygivar ............. E04G 21/3204
11,179,585 B2 * 11/2021 Keller ................... E04G 21/328
11,459,780 B2 * 10/2022 Martin Iglesias ..... E04G 21/329
2002/0017427 A1 * 2/2002 Guenette .................. A62B 1/08
182/45
2004/0074695 A1 * 4/2004 Henry ................ A62B 35/0068
182/3
2005/0169735 A1 * 8/2005 Pelsue ................ A62B 35/0068
414/469
2006/0289233 A1 * 12/2006 Flaherty .............. E04G 21/3276
182/45
2007/0108428 A1 * 5/2007 Sadinsky ............ E04H 12/2269
256/65.14
2009/0263221 A1 * 10/2009 Oldershaw .............. E21B 19/15
414/495
2014/0319896 A1 * 10/2014 Meillet .............. A62B 35/0068
405/232
2015/0224350 A1 * 8/2015 Harvey ................ F16M 13/022
248/231.9
2016/0333650 A1 * 11/2016 Berrier .................. E21B 19/165
2019/0240515 A1 * 8/2019 Saygivar ............. E04G 21/3276
2019/0299036 A1 * 10/2019 Baracco ................. A62B 35/04
2020/0129789 A1 * 4/2020 Gorman ............. A62B 35/0068
2020/0224524 A1 * 7/2020 Parmeshwar ........... E21B 47/09
2020/0330802 A1 * 10/2020 Keller ................ A62B 35/0068
2021/0016114 A1 * 1/2021 Franke ............... A62B 35/0006
2021/0262246 A1 * 8/2021 Martin Iglesias ...... A62B 35/04

* cited by examiner

PERSONNEL SAFETY CABLE MOUNT ASSEMBLY

CROSS REFERENCE

This application is based on and claims priority to U.S. Provisional Application Ser. No. 62/873,376, filed Jul. 12, 2019, which is incorporated herein in its entirety by reference.

BACKGROUND OF THE INVENTION

Field of the Invention

The present invention is directed to a personnel safety cable mount assembly used as a safety mechanism for personnel during rig-up and rig-down procedures on a drilling rig.

Description of the Related Art

Equipment on a drilling rig is often mounted on a drill floor above a substructure spaced above ground level. The equipment is brought to a proposed drill site and the drilling rig is assembled. Personnel will assemble the drill floor as well as the various equipment located on the drill floor such as a mast, hydraulic equipment, tubular sections, and motors. A rotary table or turntable is one piece of equipment located on the drill floor above the wellbore. The rotary table includes a frustoconical recess or bowl to receive slips that grip and hold a tubing section.

During the “rig-up” procedure, once the substructure is in place, the drill floor is assembled and all of the various equipment is installed thereon by personnel. Once the drilling operation or production operation has been completed, during the “rig-down” procedure, all of the equipment will be disassembled in a reverse procedure and moved to a new location.

It is important to protect personnel from falling off of the drill floor and from injury during the rig-up and rig-down procedures.

Various attempts have been made in the past to provide safety features. One prior solution is to install a number of temporary posts around the edge of the drill floor and then suspend temporary cables between the posts as a fence. This requires a considerable amount of effort as the posts must be fastened to the drill floor or the substructure and the entire procedure performed in reverse during rig-down operations.

Safety mechanisms have been employed in order industries. For example, another prior design is shown in Flaherty (U.S. Pat. No. 4,942,943) which discloses a roofing safety device composed of a central upstanding shaft supported by three stabilizing struts, the feet of which are fixed to a roofing surface with screws or other fasteners. It is required to attach the central shaft and the stabilizing struts to the roofing surface with fasteners and then unfasten and remove the fasteners at the end of the project.

Vesternik (U.S. Pat. No. 7,537,085) discloses a fall restraint mechanism having a retractable post with a jib to support a cable attached at the top of the retractable post a set horizontal distance away from the post to be mounted atop poles, posts or outer walls of buildings.

Cruz (U.S. Pat. No. 9,010,487) discloses a safety line anchor system having a central post threaded on one end to fit into a trench plate.

Notwithstanding the foregoing, there remains a need to provide a fall arrest or personnel safety cable mount assembly system that may be easily and simply installed without any attachment by any sort of fasteners and that may be removed without removal of any fasteners.

There also remains a need to provide a fall arrest or personnel safety cable mount assembly system that may be installed on a temporary basis during equipment installation and then removed before operation of the equipment.

SUMMARY OF THE INVENTION

The present invention is directed to a personnel safety cable mount assembly to prevent personnel working on a drill floor from falling and to provide a fall arrest system.

In a first preferred embodiment, the assembly includes a frustoconical base having a tapered diameter slightly less than the tapered diameter of a frustoconical recess in a rotary table on the drill floor. The frustoconical base is received in and fits within the frustoconical recess. The frustoconical base of the assembly is retained by gravity in the frustoconical recess.

In another embodiment, the base is received in a frustoconical mouse hole or other opening in the drill floor.

In a second preferred embodiment, the assembly includes a base received in and passed through a recess or opening in the drill flor, such as a mouse hole. The base includes a stop ring plate having a diameter larger than the frustoconical opening. The base also includes a lock assembly which moves between a retracted and extended position. The lock assembly includes an interface slidably received on a post or pole and a plurality of connecting links pivotally connected with the interface and a plurality of lock fingers pivotally connected to said connecting links.

In each embodiment, an extending post or pole is coaxial with and extends from the base. The pole extends above the base and above the drill floor above the height of any personnel.

A connector bracket is located at or near the top of the pole. The connector bracket includes a plurality of lanyard eyes arranged radially around the pole. One or more lanyards may be connected to the lanyard eyes of the connector bracket. In a preferred embodiment, a self-retracting lanyard having an extending cable is connected to one of the lanyard eyes.

At the end of the extending cable is a clip, latch or the like which is adapted to attach to a vest or belt worn by personnel.

When not in use, the extending cable and the clip, latch or the like may be retained by attaching to a lanyard hitch which extends radially from the pole between the top of the pole and the base. A hitch protection ring extends radially outward from the pole with a greater diameter than the hitch.

DETAILED DESCRIPTION OF THE INVENTION

The embodiments discussed herein are merely illustrative of specific manners in which to make and use the invention and are not to be interpreted as limiting the scope.

While the invention has been described with a certain degree of particularity, it is to be noted that many modifications may be made in the details of the invention's construction and the arrangement of its components without departing from the scope of this disclosure. It is understood that the invention is not limited to the embodiments set forth herein for purposes of exemplification.

Figure 1:
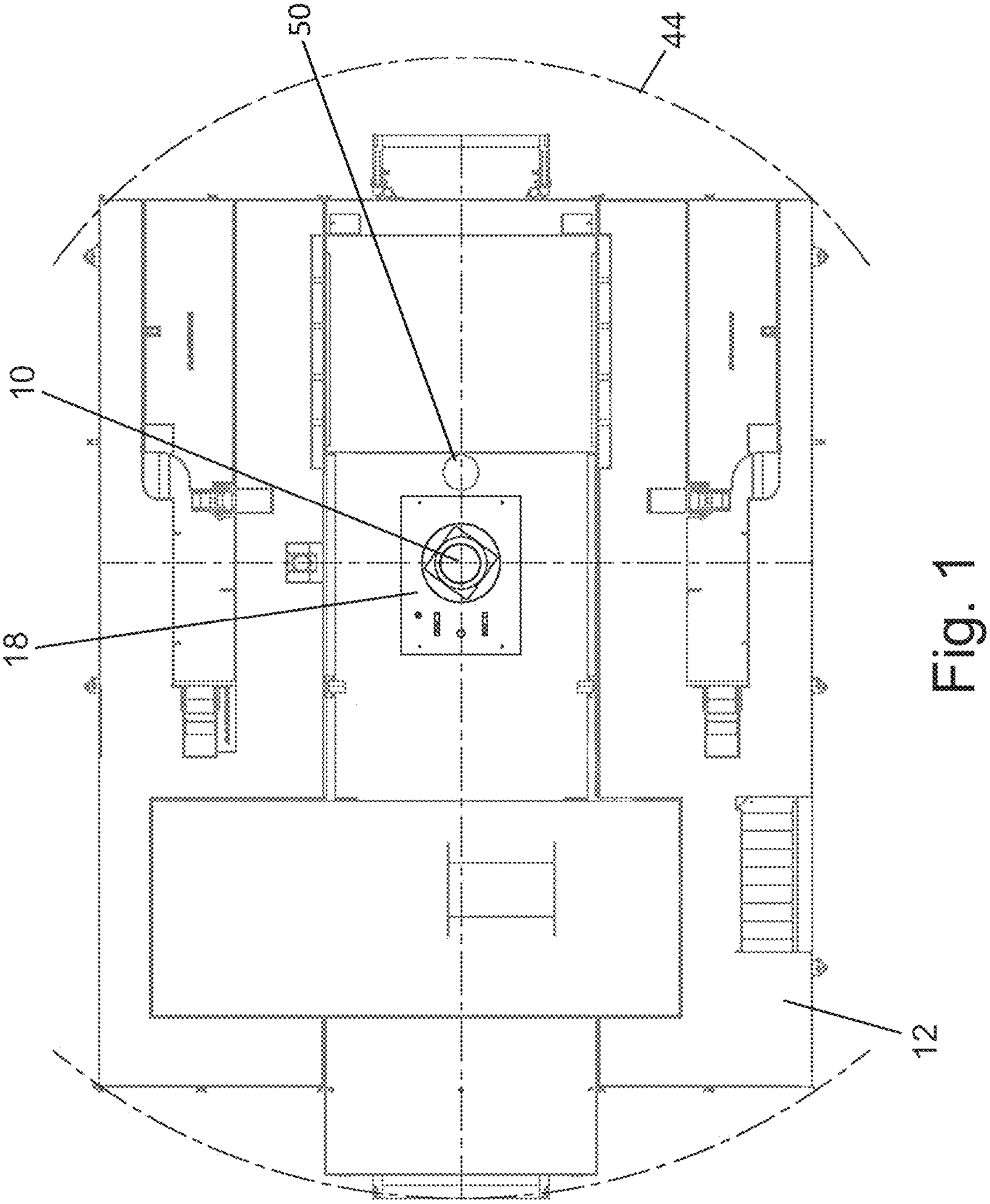
FIG. 1 illustrates a top view of a first preferred embodiment of a personnel safety cable mount assembly on a drill floor constructed in accordance with the present invention.
Figure 2:
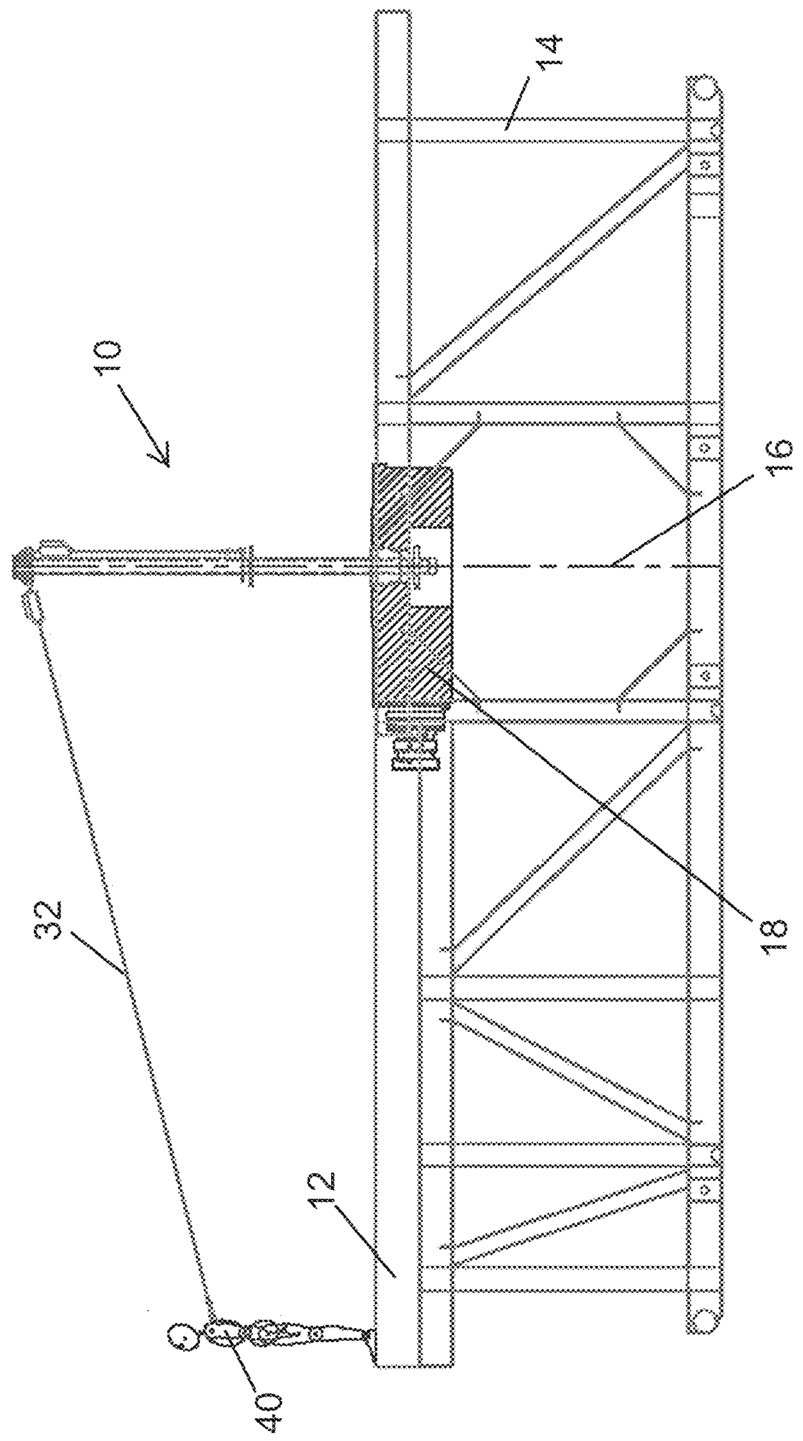
FIG. 2 illustrates a side view of the personnel safety cable mount assembly shown in FIG. 1 with portions of a rotary table on the drill floor cut-away for ease of viewing.

Referring to the drawings in detail, FIG. 1 illustrates a top view and FIG. 2 illustrates a side view of a first preferred embodiment of a personnel safety cable mount assembly 10 on a drill floor 12 which is supported by a substructure 14 (seen in FIG. 2) over a wellbore (illustrated by dashed line 16 in FIG. 2).

Once assembled, the drill floor 12 is located some distance above ground level. Accordingly, it is desirable to prevent personnel working on the drill floor from falling and to provide a fall arrest system.

A series of other equipment is brought in and installed beneath the substructure 14, such as a blowout preventer (not shown). Additionally, a wide variety of equipment is brought onto and installed on the drill floor 12, such as a mast, various mechanical devices, hydraulic equipment, tubular sections, doghouses (for personnel), and other equipment.

In a first preferred embodiment, the assembly 10 is temporarily installed in an existing frustoconical recess in a rotary table 18.

As seen in FIGS. 1 and 2, a rotary table 18 (sometimes referred to as a turntable) is located on and supported by the drill floor 12 above the wellbore 16. During operation of the drilling rig, the rotary table 18 provides rotational force to a tubular pipe or drill string (series of tubular pipes). The rotary table 18 may be chain driven or driven in another manner.

FIGS. 1 and 2 show the drill floor 12 after installation of the rotary table but before installation of the other equipment.

The rotary table 18 includes a frustoconical opening or recess 20 (sometimes referred to as a bowl) mounted above the wellbore 16 (illustrated by dashed lines). The frustoconical recess 20 passes through the drill floor 12. During operation of the drilling rig, the frustoconical recess 20 receives slips (not shown) which grip a section of tubular pipe (not shown).

Figure 3:
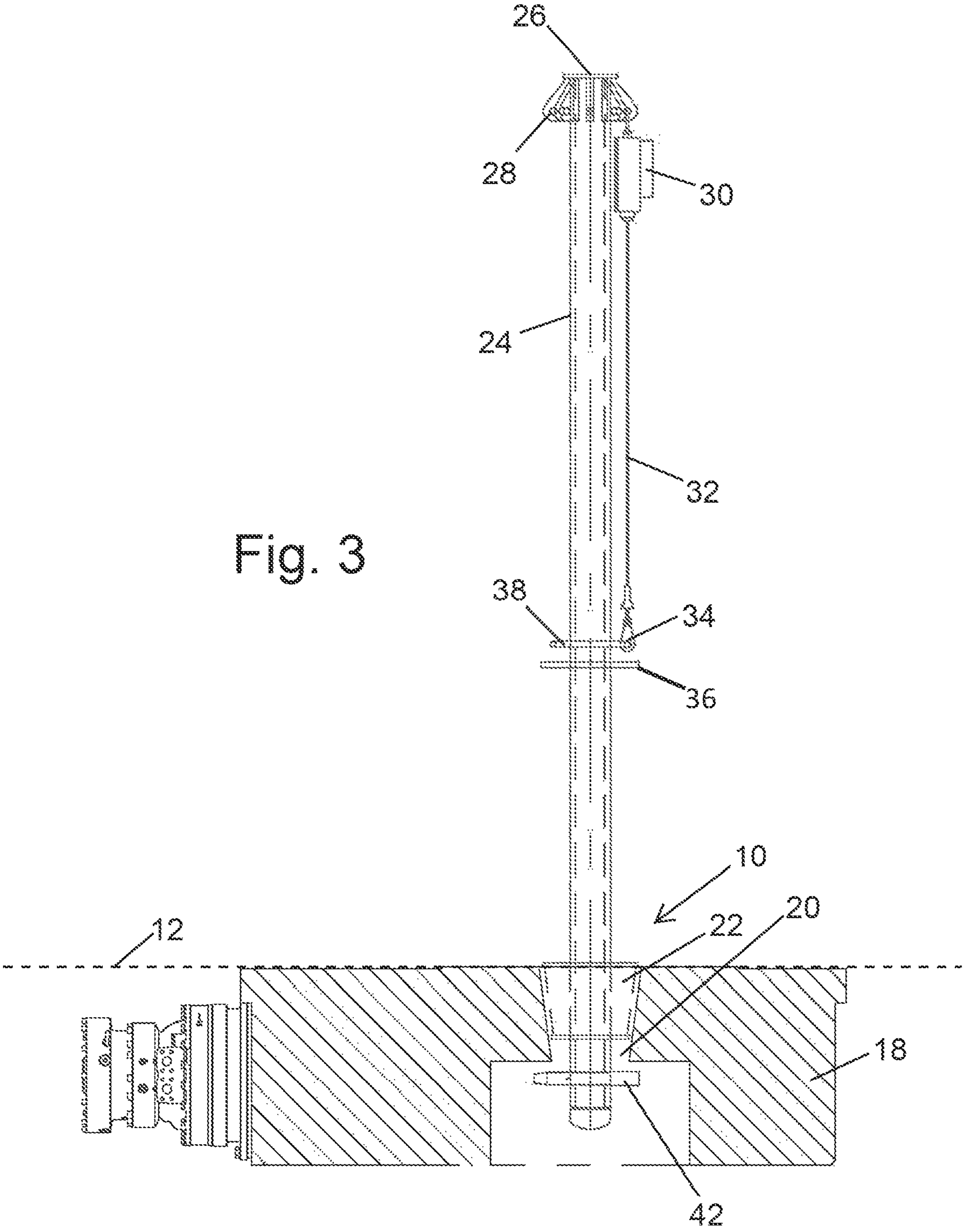
FIG. 3 illustrates a side view of the personnel safety cable mount assembly shown in FIG. 1 installed in a rotary table apart from the drill floor with portions of the rotary table cut-away for ease of viewing.

FIG. 3 illustrates the rotary table 18 and the assembly 10 apart from the drilling rig substructure 14 and the drill floor 12. The rotary table 18 is shown partially cut-away for ease of viewing.

In a first preferred embodiment, a frustoconical base 22 of the assembly 10 has a tapered diameter slightly less than the tapered diameter of the frustoconical recess 20 in the rotary table 18. The diameter of the recess 20 decreases as it extends below the surface of the floor. Accordingly, the frustoconical base 22 is configured to be received in and fits within the frustoconical recess 20. The frustoconical base 22 is retained by gravity in the frustoconical recess 20.

A vertically extending post or pole 24 is coaxial with and extends through the frustoconical base 22. In the embodiment shown, the pole 24 extends through the lower end of the frustoconical base 22. After the pole 24 and frustoconical base 22 are lowered into the recess 20, an optional safety fastener 42 passes through an opening in the pole. The safety fastener 42, in the form of a pin or rod, has a length greater than the diameter of the frustoconical recess. Accordingly, once the safety fastener 42 has been installed, the base 22 cannot be removed from the recess or opening.

In another embodiment, the base 22 is received in a frustoconical mouse hole 50 (seen in FIG. 1) which extends into and through the drill floor 12. During drilling or production operation, the mouse hole in the drill floor 12 is used to hold sections of tubular pipe in order to assist in making rapid connections of the tubulars.

Figure 4:
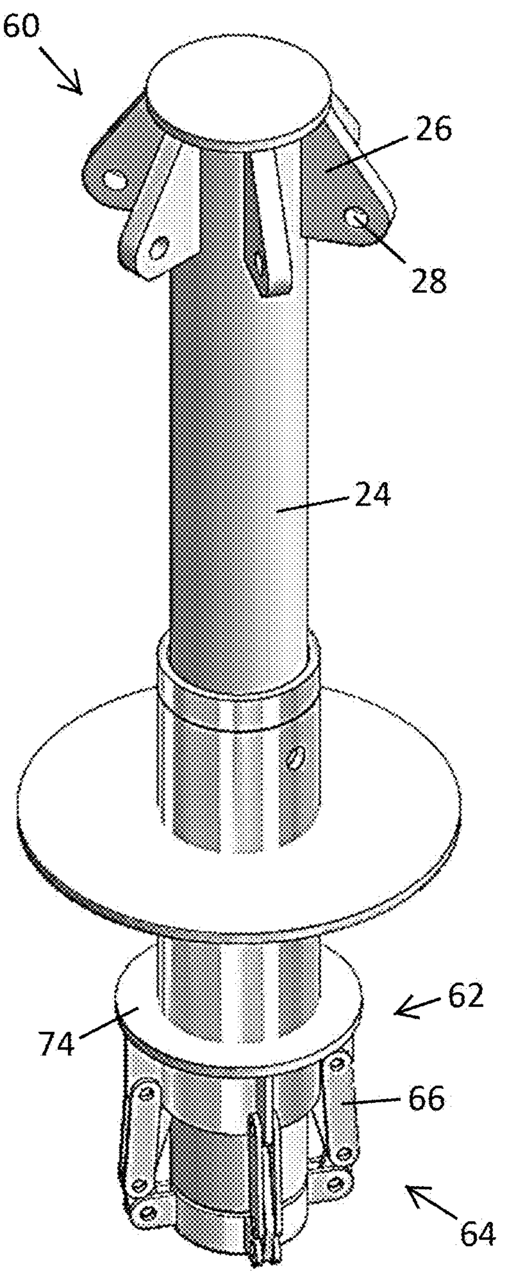
FIG. 4 illustrates a perspective view of a second preferred embodiment of a personnel safety cable mount assembly with a lock assembly in a retracted position for installation and removal.
Figure 5:
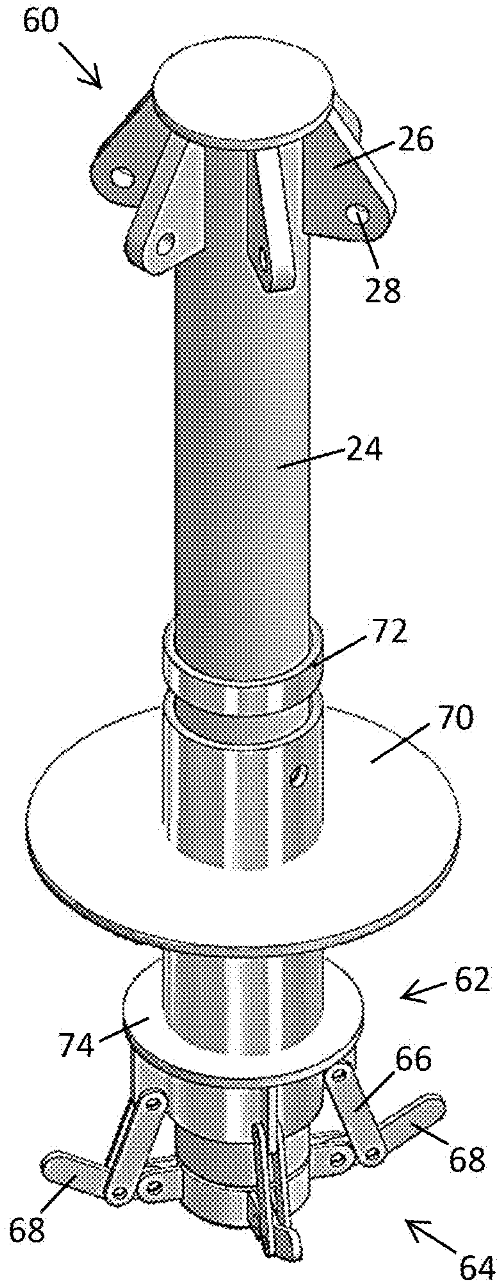
FIG. 5 illustrates a perspective view of the personnel safety cable mount assembly shown in FIG. 4 with the lock assembly extended in a locked position.

FIG. 4 illustrates a perspective view of a second preferred embodiment of a personnel safety cable mount assembly 60 with a lock assembly 64 retracted for installation and removal. FIG. 5 illustrates a perspective view of the embodiment shown in FIG. 5 with the lock assembly 64 extended.

A base assembly 62 is configured to be received in and through an opening or recess of the drill floor 12, such as a frustoconical mouse hole 50 (seen in FIG. 1). A stop ring plate 70 has a diameter larger than the mouse hole 50 so that the plate rests on the drill floor. A stop 72 affixed to the pole limits movement of the stop plate ring 70. The lock assembly 64 includes an interface 74 which is slidably received on the pole 24 and has a diameter slightly larger than the smallest diameter of the recess; and a plurality of connecting links 66 pivotally connected with the base 62 and a plurality of lock fingers 68 pivotally connected to the connecting links 66. Accordingly, in the retracted position shown in FIG. 4, the base 62 and the lock assembly 64 will pass into and through the opening or recess 50. The interface 74 will slide open, forcing the lock fingers 68 outward.

Once installed in the opening, the lock fingers 68 may not be withdrawn from the opening as shown in FIG. 5. It will be appreciated that no tools or fasteners are necessary to move the lock assembly between a retracted position and an extended position.

Returning to a consideration of FIGS. 1, 2 and 3, in each embodiment, the pole 24 extends above the base and above the drill floor. In a preferred arrangement, the top of the pole 24 is at a level above the drill floor above the height of any personnel.

A connector bracket 26 is located at or near the top of the pole 24. The connector bracket 26 includes a plurality of pad eyes or lanyard eyes 28 arranged radially around the pole 24. One or more lanyards 30 may be connected to the connector bracket 26. In a preferred embodiment, a self-retracting lanyard 30 having an extended cable 32 is connected to a lanyard eye 28.

At the end of the extended cable 32 is a clip, latch or the like 34 which is adapted to attach to a vest or a belt worn by personnel 40.

When not in use, the cable 32 and the clip, latch or the like 34 may be retained by attaching to a lanyard hitch 38 which extends radially from the pole 24 between the top of the pole 24 and the frustoconical base 22. A hitch protection ring 36 extends radially outward from the pole 24 with a greater diameter than the hitch 38.

In order to utilize the first preferred embodiment of the assembly 10 during the installation or rig-up procedure, once the substructure 14 and drill floor 12 has been put in place along with the rotary table 18, the personnel safety cable mount assembly 10 is brought to the drill floor 12. The frustoconical base 22 of the assembly 10 is lowered into the open frustoconical recess or bowl so that the base 22 resides within the frustoconical recess 20.

The optional safety fastener 42 is secured to the pole 24 below the drill floor 12. The upwardly extending pole 24 extends above the level of the drill floor 12. One or more self-retracting lanyards 30 with cables 32 are attached to and suspended from the lanyard eyes 28 of the connector bracket 26. Personnel 40 (shown in FIG. 2) will attach a clip or latch 34 at the end of the cable 32 onto a belt or vest worn by the personnel 40. The length of the cable will be provided such that it does not extend significantly beyond the outer dimension of the drill floor such as shown by dashed line 44 in FIG. 1.

The position of the connector bracket 26 will preferably be above the height of the personnel so that personnel can walk beneath the cable 32.

Once the various equipment on the drill floor 12 has been installed, the extending cable 32 of the lanyard 30 will be detached from the personnel 40. The extending 32 cable will be clipped to the lanyard hitch 38. If a safety fastener beneath the drill floor has been employed, it will be removed. The pole 24 and its frustoconical base 22 will be lifted up and out of the frustoconical recess 20 of the rotary table. Accordingly, no fasteners are required for the installation, use or removal of the assembly 10.

During the drilling operation, the rotary table is free to be employed for its intended purpose. Once the drilling operation is completed, the reverse operation will be employed. The assembly 10 will again be brought to the drill floor. The frustoconical base 22 of the assembly is lowered into the open frustoconical recess 20 or bowl so that the base resides in the recess 20. The optional safety fastener 42 will be installed through the pole 24 below the drill floor. The extended cable having the lanyard will be attached to personnel during work on the drill floor.

Accordingly, the present invention provides a temporary safety mechanism during rig-up and rig-down procedures without permanent attachment to the drilling rig.

Whereas, the invention has been described in relation to the drawings attached hereto, it should be understood that other and further modifications, apart from those shown or suggested herein, may be made within the scope of this invention.

What is claimed is:

1. A personnel safety cable mount assembly for a floor having a frustoconical recess in said floor, which assembly comprises:

a frustoconical base receivable in said frustoconical recess of said floor, wherein said floor is a drilling rig floor supported by and above a rig substructure;

a pole extending from said frustoconical base, wherein said frustoconical recess is within a rotary table supported by said drilling rig floor;

a lock assembly slidably received on said base and around a circumference of said base beneath said floor, said lock assembly having an interface, a plurality of connecting links pivotally connected with said base, and a plurality of lock fingers pivotally connected to said connecting links, said interface having a diameter slightly larger than a smallest diameter of said recess and said interface capable of forcing said plurality of lock fingers into an outward position;

a connector bracket at a top of said pole, wherein said connector bracket includes a plurality of lanyard eyes; and at least one lanyard connected to said connector bracket, each said lanyard having an extending cable adapted to attach to personnel, and wherein said at least one lanyard with said extending cable is a self-retracting lanyard.

2. The assembly as set forth in claim 1 wherein said frustoconical recess extends through said floor and wherein said pole extends through and is coaxial with said frustoconical base.

3. The assembly as set forth in claim 1 wherein said removable safety fastener is a pin.

4. The assembly as set forth in claim 1 wherein each said lanyard with extending cable is detachably connected to one of said plurality of lanyard eyes.

5. The assembly as set forth in claim 1 including a lanyard hitch extending from said pole, said lanyard hitch juxtaposed between said frustoconical base and said top of said pole.

6. The assembly as set forth in claim 5 including a hitch protection ring extending radially from said pole.

7. The assembly as set forth in claim 1 wherein an end of said extending cable includes a clip or latch adapted to attach to a vest or belt worn by said personnel.

8. A personnel safety cable mount assembly for a floor having a frustoconical recess in and through said floor, which assembly comprises:

a base interface having a diameter less than the largest diameter of said recess;

a pole extending from said base and above said floor, wherein said floor is a drilling rig floor supported by and above a rig substructure, and wherein said recess is within a rotary table supported by said drilling rig floor;

a lock assembly slidably received on said base and around a circumference of said base beneath said floor, said lock assembly having an interface, a plurality of connecting links pivotally connected with said base, and a plurality of lock fingers pivotally connected to said connecting links, said interface having a diameter slightly larger than a smallest diameter of said recess and said interface capable of forcing said plurality of lock fingers into an outward position;

a connector bracket at a top of said pole, wherein said connector bracket includes a plurality of lanyard eyes; and at least one lanyard connected to said connector bracket, each of said at least one lanyard having an extending cable adapted to attach to personnel, and wherein said at least one lanyard with said extending cable is a self-retracting lanyard.

9. The assembly as set forth in claim 8 including a stop ring plate having a larger diameter than said recess configured to rest on said floor.

10. The assembly as set forth in claim 8 wherein said recess is a frustoconical mouse hole in said drilling rig floor.

11. The assembly as set forth in claim 8 including a lanyard hitch extending from said pole, said lanyard hitch juxtaposed between said base and said top of said pole.

* * * * *